United States Patent
Guillotte et al.

(10) Patent No.: US 11,833,616 B2
(45) Date of Patent: Dec. 5, 2023

(54) METHOD FOR THE CREATION OF AN IRIDESCENT EFFECT ON THE SURFACE OF A MATERIAL, AND DEVICES FOR CARRYING OUT SAID METHOD

(71) Applicant: APERAM, Luxembourg (LU)

(72) Inventors: Ismaël Guillotte, Verquin (FR); Baptiste Latouche, Lille (FR); Marcos Vinicius Lopes, Bethune (FR); Jean-Michel Damasse, Saint Etienne (FR); Francis Diet, Paris (FR)

(73) Assignee: APERAM, Luxembourg (LU)

( * ) Notice: Subject to any disclaimer, the term of this patent is extended or adjusted under 35 U.S.C. 154(b) by 107 days.

(21) Appl. No.: 17/603,987

(22) PCT Filed: Apr. 16, 2019

(86) PCT No.: PCT/IB2019/053117
§ 371 (c)(1),
(2) Date: Oct. 15, 2021

(87) PCT Pub. No.: WO2020/212728
PCT Pub. Date: Oct. 22, 2020

(65) Prior Publication Data
US 2022/0184740 A1 Jun. 16, 2022

(51) Int. Cl.
*B23K 26/352* (2014.01)
*B23K 26/0622* (2014.01)
(Continued)

(52) U.S. Cl.
CPC ........ *B23K 26/355* (2018.08); *B23K 26/0624* (2015.10); *B23K 26/0821* (2015.10); *B23K 2101/18* (2018.08); *B23K 2103/05* (2018.08)

(58) Field of Classification Search
CPC .............. B23K 26/355; B23K 26/3584; B32K 26/0624
See application file for complete search history.

(56) References Cited

U.S. PATENT DOCUMENTS

| 6,605,797 B1 | 8/2003 | Troitski |
| 2006/0138103 A1 | 6/2006 | Troitski et al. |
| (Continued) | | |

FOREIGN PATENT DOCUMENTS

| CN | 108351564 A | 7/2018 |
| CN | 109154562 A | 1/2019 |
| (Continued) | | |

OTHER PUBLICATIONS

Liu et al., Evolution of nano-ripples on stainless steel irradiated by picosecond laser pulses, Journal of Laser Applications, vol. 26, No. 1, 6 pp. (Feb. 2014).

(Continued)

*Primary Examiner* — Geoffrey S Evans
(74) *Attorney, Agent, or Firm* — MARSHALL, GERSTEIN & BORUN LLP

(57) ABSTRACT

A method for creating an iridescent effect on a surface through formation of wavelets on the source can include using a pulse of laser beams sent to the surface in juxtaposed optical fields of a focusing system. A scanner scans the surface using laser beams along a series of lines that follow each other in a relative direction of travel of the part and of the scanner and a series of lines that lie in continuation of each other in a direction perpendicular to the relative direction of travel. The optical fields overlap in an overlapping area having a width that is twice the diameter of the pulse laser beam up to 2 cm. Two lines lying in continuation of each other overlap at a junction and between the two series of lines follow each other in a relative direction of travel of the part and the scanner.

16 Claims, 3 Drawing Sheets

(51) Int. Cl.
*B23K 26/082* (2014.01)
*B23K 101/18* (2006.01)
*B23K 103/04* (2006.01)

(56) References Cited

U.S. PATENT DOCUMENTS

| | | | |
|---|---|---|---|
| 2010/0035375 A1* | 2/2010 | Grigoropoulos | ........................... H01L 21/76838 427/555 |
| 2010/0272961 A1* | 10/2010 | Costin, Jr. | ............ B23K 26/082 428/156 |
| 2011/0297653 A1* | 12/2011 | Ehrentraut | ......... B23K 26/0853 219/121.61 |
| 2015/0352664 A1 | 12/2015 | Errico et al. | |
| 2019/0024689 A1* | 1/2019 | Sabau | ................ B23K 26/0622 |

FOREIGN PATENT DOCUMENTS

| | | |
|---|---|---|
| EA | 026083 B1 | 2/2017 |
| RU | 2379581 C1 | 1/2010 |
| RU | 2573160 C2 | 1/2016 |
| RU | 2580901 C2 | 4/2016 |
| WO | WO-2020212729 A1 * 10/2020 | ........... B23K 26/048 |

OTHER PUBLICATIONS

International Application No. PCT/IB2019/053117, International Search Report, dated Jan. 17, 2020.

* cited by examiner

METHOD FOR THE CREATION OF AN IRIDESCENT EFFECT ON THE SURFACE OF A MATERIAL, AND DEVICES FOR CARRYING OUT SAID METHOD

CROSS-REFERENCE TO RELATED APPLICATION

This application is a U.S. national stage of International Patent Application No. PCT/IB2019/053117 filed Apr. 16, 2019, the disclosure of which is incorporated herein by reference in its entirety.

FIELD OF THE DISCLOSURE

The present invention concerns laser treatments of the surfaces of stainless-steel sheet or other materials, intended to impart an iridescent appearance to these surfaces.

BACKGROUND

Iridescent treatment also called «LIPPS» or «ripples» entails irradiating the surface of a material with pulsed laser radiation of short pulse duration (less than one nanosecond). The diameter of each pulse at its point of impact on the material to be treated is typically in the region of 10 to a few hundred µm. If the energy of the incident beam is sufficiently high, this irradiation induces modification of the structure and/or reorganization of the surface of the material which will take on a periodic structure. However, if the energy of the beam is too high, an ablation phenomenon via vaporization/sublimation/shock wave can take place, preferably jointly with the formation of the periodic surface structure. The range of amount of energy to be used can be easily determined experimentally for a given material, to obtain the desired iridescent effect with or without change of surface condition or shine.

SUMMARY

Said treatment is particularly but not solely performed on stainless steels of all types. The objective of the treatment can be purely aesthetic but it also allows modifications of surface wettability as well as resistance to friction and a reduction in bacterial adherence. This treatment can be performed directly on the surface of the object having a stainless-steel passivation layer without the need for prior activation/depassivation.

Other materials on which this treatment is performed are in particular various metals, polymers such as PVC, ceramics, glass.

In the remainder hereof, priority is given to the case of stainless steels on the understanding that the invention applies to all metal or nonmetal materials currently known or which may be known in the future, to obtain an iridescent effect subsequent to laser treatment performed as indicated, optionally by adapting the precise operating parameters of the installation (power and frequency of lasers . . . ) which are known to play a role in obtaining an iridescent effect resulting the formation of a periodic surface structure.

Although the exact mechanism of the formation of the this periodic surface structure has not yet been determined, the tests and characterizations carried out by different laboratories show that as a function of the number of laser passes and/or pulse energy and/or scanning parameters, the surface structure can exhibit one of the four following structures depending on the total irradiation energy per unit surface area, these structures being classified in increasing energy order and the naming thereof usually being used by persons skilled in the art even non-English speaking persons:

1) So-Called «HSFL» Structure (High Spatial Frequency LIPPS):

This structure is composed of small ripples which, for stainless steels, are oriented in the direction of polarization of the incident laser beam. The spatial frequency of these ripples is smaller than the wavelength of the laser used for the treatment.

2) So-Called «LSFL» Structure (Low Spatial Frequency LIPPS):

This structure is composed of larger ripples than in the preceding structure and are oriented, for stainless steels, in the direction perpendicular to polarization of the incident beam. The spatial frequency of these ripples is slightly smaller or larger, or equal to the wavelength of the laser. For the surface treatment of stainless steel with a laser of wavelength 1064 nm, the periodicity of the ripples is in the region of 1 µm. The HSFL structure can still be seen in the grooves of the LSFL structure.

It is to be noted that for some materials, the respective orientations of the HSFL and LSFL structures can be reversed compared to those for stainless steels.

3) So-Called «Grooves» or «Bumps» Structure:

This structure is composed of bumps of micrometric size covering the entirety of the treated surface. These bumps are organized in a structure resembling a «snakeskin» appearance.

4) Structure in «Spikes»:

This structure is composed of spikes having a height ranging from a few micrometres to a few tens of micrometres. The distance separating the spikes is dependent on treatment parameters.

Further details on the structures and the mechanism of their onset can be found in particular in the article «Evolution of nano-ripples on stainless steel irradiated by picosecond laser pulses», Journal of Laser Applications 26, February 2014, by B. Liu et al. It is reported therein that for an equal number of pulses, an increase in the fluence of irradiation leads to obtaining HSFLs rather than LSFLs (as just indicated) whereas at equal fluence a higher number of pulses leads to the creation of LSFLs rather than HSFLs up until the number of pulses becomes too high for observation of the ripples. The exact configuration of the surface after irradiation therefore results from a mechanism involving both the number of received pulses and the energy delivered by each thereof, for a given material. This mechanism is complex, but for a given material reliable conditions for obtaining one or other of the above-cited configurations can be experimentally determined by the user.

In general, in the first two cases, this periodic surface organization allows an induced phenomenon, well known to operators of laser surface treatment, which is diffraction of light through the creation of an optical network when the treated sample is placed under a light source. As a function of the orientations and positions of the user, and of light, the colours of the rainbow can be seen on the sample. This is what is known as an «iridescent effect».

This effect no longer exists when the surface of the sample has a pronounced appearance of the third or fourth above-cited cases, since in these two cases the energy delivered by the laser source onto the surface of the sample has reached a level that is too high at least locally, causing surface deformations which no longer allow obtaining of the iridescent effect, since the surface structuring has lost its periodic nature.

This iridizing is not to be confused with the surface colouring of stainless steels which is obtained, whether or not voluntarily, by plasma treatments or surface oxidations obtained by furnace or torch treatments. The iridescent effect under consideration in the present invention does not result from colouring of the material in the strictest sense but from the appearance of colours on the surface under certain conditions of observation. The absence of periodicity of surface structure in colouring processes properly co-called is an essential difference between surface iridizing according to the present invention and the colouring of stainless steels via plasma, furnace or torch treatments.

It is to be noted however that the observation or non-observation of said iridization is usually highly directional i.e. the observation of this iridization and the intensity of observed iridization are highly dependent upon the angle at which the surface of the material is viewed One problem encountered by operators of surface iridizing is the following.

It is currently possible to obtain homogeneous samples in a laboratory with iridizing treatment using either solely a system coupling together a laser and a scanner producing both a rapid travel axis of the laser beam (via a polygon wheel or galvanometer mirror) and a slow travel axis of the laser beam (via a galvo mirror), or a laser and scanner system coupled with a robotized arm moving the scanner along the slow axis in relation to the object to be treated.

Movement of the scanner along the slow axis can be replaced by movement of the object to be treated e.g. metal sheet along the slow axis in front of a laser which remains fixed on the slow axis and moves along the fast axis. Provision can also be made so that the laser remains fixed along both axes (slow and fast) and it is the object to be treated which is moved along both axes. All that is essential is that there is relative movement between the object to be treated and the laser, successively along both axes.

The formation mechanism of the structures just described is dependent on the total energy transferred onto the surface of the material and on the spatial and temporal distribution of this energy. Therefore, the «intensity» of iridization obtained with LSFLs will increase between each new pass of the laser on the passes already treated, up until a maximum is reached, after which it will decrease when the LSFLs will gradually become "bumps" under the effect of the additional applied energy.

This means that there exists an energy optimum to be transferred onto the surface of the material, an optimum for which the iridescent effect is the most intense, this optimum to be determined and applied to all the surface under consideration.

However, the treated objects are generally of small size and/or obtained with low productivity.

The size restriction of objects is mainly due to the limited dimensions of the optical fields of the assemblies formed by the laser, scanner and focusing system, the latter possibly being for example a lens of convergent mirror. The obtaining of homogeneous treatment requires perfect control over the treatment at every point of the surface. Yet, irrespective of the focusing systems used, they all have an optical field on which they have a stable effect within an optimal area. But as soon as departure is made from this optimal area, the system induces distortions and/or attenuations of the power of the laser beam. These translate as non-homogeneous treatment between the optimal area of the optical field and the areas lying beyond this optimal area.

Therefore, to treat large surfaces of stainless-steel sheet, wide-field focusing systems are required which would be bulky and only built on request. In addition, they would need to be used jointly with lasers of ultrashort pulse duration and of high power, these not yet being widely available on the market.

To overcome this twofold disadvantage, known solutions are to use conventional focusing systems and lasers currently available on the market, and:
  either to place several devices including these focusing and laser systems side by side, for the line treatment of a travelling strip;
  or to perform the treatment several times (on a succession of strips distributed over the surface, for a batch system);
  or to combine these two solutions.

However, this solution requires particularly careful management of the junction zones between the optical fields of two successive devices which, if ill-managed, can cause a phenomenon known as «stitching» by those skilled in the art, which will be described below.

This mechanism prevents having recourse to a very significant overlap of the fields, to join together two consecutive fields of laser treatment.

If there is very significant overlapping of the fields, in the order of magnitude of the resolution of the human eye, this would mean that the overlap area receives twice the amount of energy transferred onto the remainder of the surface. This doubling of energy injected at the time of treatment causes local change in the structure and hence in surface appearance compared with the areas which only received the nominal amount of energy of the treatment, and this change is visible to the naked eye. It is this phenomenon that is commonly called «stitching», in that it can make visible the junction zone between two fields.

On the contrary, spacing between the laser treatment fields, which would assuredly prevent this phenomenon, would imply the formation between two fields of a non-treated zone or which at all events would receive less treatment than normal. This zone would also be visible to the naked eye.

A near-perfect junction is therefore needed between consecutive laser treatment fields.

Additionally, the performing of this type of treatment with high productivity implies scanning at high speeds (at least of up to km/s). The scanning systems used for this type of treatment are most typically scanners having at least one polygon wheel. At high laser frequencies and high scanning speeds, these systems generally exhibit synchronization problems between the laser electronics and scanner electronics. These differences in synchronization cause shifting in the position of the first pulse in relation to its targeted position, and hence of the entire line. Even though this difference is predictable and computable (since resulting from the difference in the management frequencies of the two items of equipment) it is encountered in most current systems and can represent a difference of a few tens of micrometres between the start of the treatment lines (lines due to movement of the polygon wheel). This difference is a function of the rotation speed of the polygon and own frequency of the laser, and experience has shown that an overlap of the fields with such difference is sufficient enough to enable the zone, in which treatment has been doubled, to impact the iridescent effect of the metal sheet.

Some systems under development have internal means for partially correcting this offset, via the action of an additional deflector mirror, called «galvo», operating in the manner of a galvanometer positioned upstream of the polygon. For example, the RAYLASE company presented the concept of a said system at the SLT 2018 Congress in Stuttgart on 5 and 6 Jun. 2018: «New Generation of High-Speed Polygon-Driven 2D Deflection Units and Controller for High-Power and High-Rep. Rate Applications» (presentation by E. Wagner, M. Weber and L. Bellini).

The improvement alone is not of sufficient quality however for the adverse effects of field offsetting to disappear definitely. There is a risk that the initial and ends parts of each line are not treated with the same delivered energy as the remainder of the line. The corresponding lines of two contiguous fields also need to be strictly aligned.

To solve this local deficiency of treatment, it can be imagined to increase the delivered energy on the remainder of the line, but this would carry the risk of exceeding the maximum amount of energy adapted for creation of LSFLs, and of reducing and even preventing iridization. For all the other systems, this lack of synchronisation implies the need for a «virtual» overlap of the order of at least twice the dispersion of the positions of the line starts between the different optical fields. Therefore, this overlap translates as a heterogeneous strip in which there are no nontreated zones between fields, but in which there may be an overlap of twice this dispersion at some points.

If the edges of each field are defined as «straight lines» and if therefore the length of each line of each field is constantly the same, as is evident a priori for persons skilled in the art, the overlapping area will then be in the form of a thin rectilinear strip covering the part in the relative direction of travel of the part and of the laser scanning devices, having a width substantially equal to the width of the treatment lines hence substantially equal to twice the diameter of the pulse, on which the appearance of treatment will not be the same as on the remaining surface. Similarly, if the edges of the treatment field are defined by a periodic pattern, the overlapping area will reproduce this pattern and is nevertheless visible to the naked eye.

It is the objective of the invention to propose a laser method with ultrashort pulses for treating a surface of a product such as stainless-steel sheet, but not limited thereto, allowing the junction zone of several successive optical fields to be made invisible to the naked eye, the fields being arranged so that together they allow the treatment of a larger surface portion (typically the entirety thereof) than would be possible with a single optical field. This method must have good productivity so that it can be applied in economically viable manner on an industrial scale for the treatment of products of large surface area.

For this purpose, the subject of the invention is a method for creating a visual iridescent effect on the surface of a part, whereby laser beams having a pulse duration of less than one nanosecond are projected onto said surface in the juxtaposed optical fields of the focusing systems of at least two fixed devices, or in the field of at least one mobile device, said device(s) each comprising a laser source, a scanner and said focusing system for applying a structure in the form of wavelets to said surface over the width of said pulse, and said surface is scanned by said scanner(s) with said laser beams along a series of successive lines in a relative direction of travel of the part and of the scanner(s), and a series of lines lying in the continuation of each other in a direction perpendicular to said relative direction of travel, and each belonging to the optical field of the device(s), each line being of width equal to the diameter of said pulse, characterized in that said optical fields of two fixed juxtaposed devices or the optical fields corresponding to two successive positions of said mobile device overlap in an overlapping area of width between twice the diameter of the pulse of the laser beam and 2 cm, so that two lines in continuation of each other overlap at a junction, and in that between two series of successive lines in a relative direction of travel of the part and of the scanner(s), said junction zones are randomly arranged or periodically organized in a random pattern with periodicity equal to at least ten times the maximum value of the offset between the junctions on two successive lines in said relative direction of travel inside said overlapping area of the optical fields.

Between performing scanning along two successive lines in said relative direction of travel of the part and of the scanner(s), it is possible to modify the polarization of the laser beam in a manner to create wavelets of different orientations on said two successive lines, and having common two-by-two orientation in the direction perpendicular to the relative direction of travel.

Polarization of the laser beam can be modified according to a periodic pattern, said periodic pattern extending over M consecutive lines in the relative direction of travel of the part and of the scanners, M being equal to at least 2, preferably to at least 3.

Two successive lines in the relative direction of travel of the part and of the scanners can have angles of polarization differing by at least 20°.

The polarizations of two lines of two contiguous fields that lie in the continuation of each other can be identical.

Said relative travel of said surface of said part and of the devices emitting said laser beams can be obtained by placing said part on a mobile support.

Said relative travel of said surface of said part and of the devices emitting said laser beam(s) can be obtained by placing the device(s) emitting said laser beams on a mobile support.

Said part can be a metal sheet.

Said surface of said part can be three-dimensional, in which case the distance is measured between the focusing system and the surface of the part, and the focusing system is controlled so that it guarantees that the diameter of the pulse and the fluence of the laser beam are substantially the same irrespective of the effective distance between the focusing system and the part.

Said surface of said part can be three-dimensional, in which case the distance is measured between the focusing system and the surface of the part, and the relative position of said device and of said surface are controlled so that the distance between said focusing system and said surface remains the same when implementing the method.

Said part can be in stainless steel.

A further subject of the invention is a device for imparting an iridescent effect to the surface of a part via the formation of wavelets on said surface by the pulse of a laser beam, said device being formed of at least two fixed juxtaposed unit devices or of at least one mobile unit device, each comprising a laser source generating a laser beam of pulse duration shorter than 1 ns, a beam-forming optical system, a scanner allowing the beam pulse, after passing through a focusing system, to line scan an optical field on the surface of the part, said optical fields of two juxtaposed unit devices overlapping over a width of between twice the diameter of the laser beam pulse and 2 cm containing the junctions of two lines each produced by a unit device, and means to create relative movement in a given direction between said device and said part to perform the treatment on at least one portion of the surface of said part, characterized in that said scanners of said unit devices allow said junctions to be arranged so that together they form a random pattern, or a periodically organized random pattern with periodicity equal to at least ten times the maximum value of the offset between the junctions on two successive lines in said relative direction of travel inside said overlapping area of the optical fields.

The optical systems of said unit devices may comprise an optical polarizing system which imparts determined polarization to said beam, and means to cause this polarization to vary so that on said surface two contiguous lines in the direction are obtained with different polarization pulses.

Said unit devices can allow two contiguous lines to be obtained with pulses having polarization differing by at least 20°.

Said unit devices may comprise means for measuring the distance between the focusing system and the surface of the part, connected to control means of the focusing system, so that the latter maintains a constant pulse diameter and constant fluence on said surface, irrespective of said distance.

Said unit devices may comprise means for measuring the distance between the focusing system and the surface of the part, connected to control means of the focusing system controlling the relative position of said device and of said surface, allowing the distance between said focusing system and said surface to be maintained constant.

Said means for creating relative movement in a given direction between said device and said part may comprise a mobile support for the part.

Said means to create relative movement between said device and said part may comprise a mobile support for said unit devices.

As will have been understood, the objective of the invention is to make invisible or practically invisible the junctions between two opposite-facing lines of the surface formed by at least two fixed, juxtaposed laser scanner devices of which the respective laser scanners both move along an axis called «slow axis», the fields of said devices slightly overlapping to prevent the risk of non-treatment or under-treatment of these junction zones. For this purpose, the junction points of said opposite-facing lines each formed by a laser scanner device are randomly arranged (i.e. the respective fast axes of the devices are in continuation of each other), if two sets of lines are considered which follow after each other in the direction of relative movement of the part and of the laser scanner devices, called «fast axis», which is substantially perpendicular to the slow axis.

Optionally, the at least two fixed juxtaposed devices can be replaced by a single mobile laser scanner device which is moved along the fast axis for the successive obtaining of opposite-facing lines in the optical fields corresponding to two successive positions of the mobile device, which is technically equivalent to the simultaneous use of several said fixed juxtaposed devices, but increases the treatment time.

In other words, the junction points of the opposite-facing lines generated by two immediately juxtaposed laser scanner devices (or a laser scanner device that has meanwhile been moved) are not located on a straight line substantially oriented along the slow axis, hence substantially perpendicular to the direction of scanning (fast axis) of the laser devices. They form a broken line of random shape, or of periodic shape but organized in a random pattern which is periodically repeated (thereby excluding a regular periodic pattern such as a sinusoid), which remains contained within the overlapping area of the fields of the two laser scanner devices, and with a general orientation that is substantially perpendicular to said scanning direction. The junctions between the optical fields of two sets of successive lines, in this general orientation, therefore do not together form a linear pattern, and this pattern is less visible to the naked eye than if it formed a substantially straight line. This pattern is not and preferably not a periodic pattern of short period which would also risk being visible to the naked eye. If the pattern is periodic, it is preferable that the length of the period should not be less than ten times the maximum value of the offset between the junctions on two successive lines.

The width of the area within which said junctions are contained must preferably not exceed 2 cm. If this width is too small (less than twice the diameter of the pulse) there is a risk of obtaining a broken line too closely resembling a straight line and the risk of visibility of the junctions would still remain. If the width is too large, the effective optical field of the devices is reduced thereby deteriorating the productivity of the installation.

Evidently, if it is necessary to have more than two laser scanner devices to treat the entirety of the surface of the part, the invention is applied step by step for all the pairs of juxtaposed devices.

This method and the associated device can also advantageously be used in conjunction with a method and associated device intended to obviate or at least very strongly attenuate problems related to excessive directionality of the viewing of iridization on the surface of stainless steel treated with a device comprising a laser scanner. With this method, different polarization is applied to the light emitted by the laser for the formation of LIPPS on two lines arranged consecutively in the relative direction of travel of the part and of the laser scanner devices. The use of at least three different polarizations applied to a series of at least three consecutive lines is recommended to obtain the sought-after effect.

BRIEF DESCRIPTION OF THE DRAWINGS

The invention will be better understood on reading the following description given with reference to following appended Figures.

DETAILED DESCRIPTION

It is therefore the objective of the invention to perform treatment of which the defects are not easily detected by the human eye which readily detects anything linear or periodic of short period. In this case, if it is considered that optimal treatment of the surface of the metal sheet 1 requires N successive passes of a laser on one same line corresponding to the fast axis of a given optical field, to inject an amount of energy necessary and sufficient to obtain the desired wavelets, the random offset from the slow axis of the N superimposed lines is identical from one laser pass to another.

Figure 1:
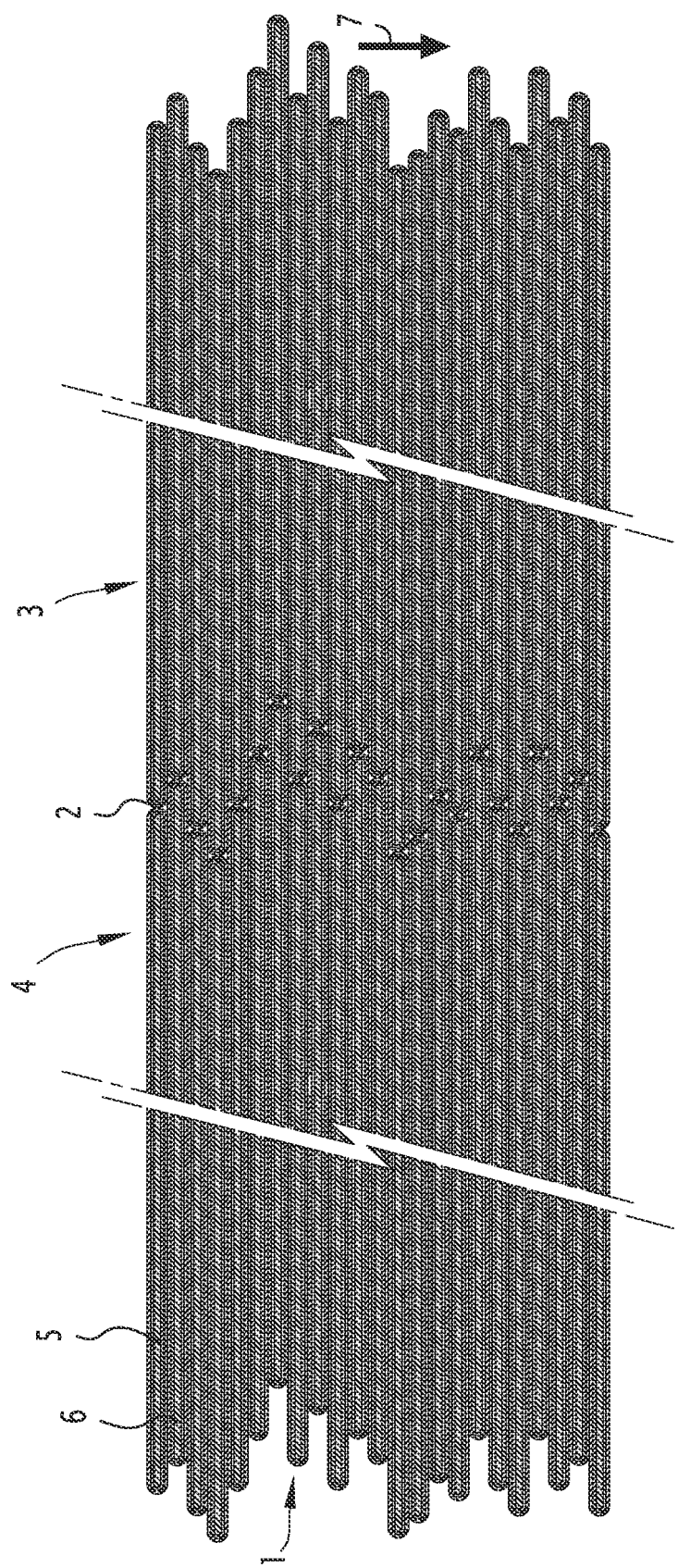
FIG. 1 shows the surface of a metal sheet on which iridizing treatment has been performed according to the invention using two juxtaposed laser devices forming lines lying in the continuation of each other along the fast axes of the devices, and with overlapping areas between two lines arranged according to the preferred variant of the invention, namely in a random broken line of which the general orientation is that of the slow axis and not in a straight line which would substantially correspond to the slow axis or in a periodic broken line generally oriented along the slow axis.

FIG. 1 schematizes said configuration, performed on a metal sheet 1. It can be seen that for series of two passes (scan lines) by the scanner 13 corresponding to two fields of juxtaposed scanners 13 lying in the continuation of each other and being slightly superimposed to prevent the presence of non-treated zones on the surface of the metal sheet 1, the junction points 2 of the respective optical fields of the two series 3, 4 of lines obtained respectively by one of the two scanners are offset not in linear fashion but randomly between two lines 5, 6, or two series of N superimposed lines successively produced along the slow axis 7 which is the relative direction of travel of the metal sheet 1 and of the laser scanners 13. In other words, the respective junctions 2 of two opposite-facing lines each belonging to a series 3, 4 do not together form a straight line or a periodic pattern of short period, but a randomly broken line which is less easily discernible than a straight line or a broken line in which the offsets of the junctions 2 are periodic and of short period.

It is to be noted that between two successive lines 5, 6 formed in the same optical field, and hence offset in the direction of travel 7 (in other words the slow axis) of the laser scanners 13, or in the direction of travel of the metal sheet 1 if it is the sheet that is mobile along the slow axis whereas the scanners are fixed, this problem does not generally arise with the same intensity unless the overlap between the lines of two series 3, 4 in succession along the slow axis 7 is manifestly poor.

It is in fact the relatively slow, relative movement of the metal sheet 1 and of the scanners 13 that is to be taken into consideration as shown by the arrow 7 defining the slow axis.

As pointed out, the different lines 5, 6 of each group 3, 4 have widths that are substantially equal to the diameter of the pulse, i.e. about 30-40 μm in general. To ensure that no non-treated zones subsist on the surface of the metal sheet, between two successive lines 5, 6 of one same group 3, 4 along the slow axis 7, it is possible to adjust the galvo of the scanner and/or the metal sheet travel device so that two successive lines 5, 6 along the slow axis 7 overlap.

In other words, the lines 5, 6 of one same group 3, 4 are formed after offsetting the relative positions of the pulses of each scanner 13 and of the metal sheet 1, the offset being slightly smaller than the diameter of the pulses. Double treatment of the surface of the metal sheet 1 in the overlapping area of lines 5, 6 may indeed occur, but since the offset of lines 5, 6 along the slow axis 7 can be controlled with good accuracy, with much better accuracy than the overlap of optical juxtaposed fields along the fast axis, the width of these areas when present is at all events sufficiently narrow (a few μm) so that the double treatment does not visually translate as perturbation of the iridescent effect in relation to the effect obtained on the remainder of the surface of the metal sheet 1. The choice can also be deliberately made not to make provision for an overlap between two successive lines 5, 6 along the slow axis 7, but to target a much-reduced offset of the order of a few μm, at all events sufficiently reduced so that it does not cause the existence of non-treated lines which would be visible to the naked eye in the direction perpendicular to the slow axis 7.

It is to be understood that in FIG. 1 each series of lines 3, 4 lying in the continuation of each other and meeting at a junction 2 is itself composed of the superimposition of N superimposed lines, with N=3 for example. The number of superimposed lines for a given optical field is dependent on the quantity of energy to be transferred to the surface of the metal sheet 1 to obtain the desired wavelet configuration responsible for the surface iridescent effect. The greater this quantity the higher the number of lines for one same energy delivered by each laser pass.

Inasmuch as possible, this configuration exhibits a structure of LSFL, type which, as we have seen, is more able to provide this iridescent effect under conditions which are nevertheless dependent on the angle of viewing. The energy delivered along a given line must therefore be contained between a lower limit below which the wavelets would not be sufficiently marked, and an upper limit above which the probability of excessive presence of bumps is strongly increased. These limits are evidently highly dependent on multiple factors, in particular the exact material of the metal sheet 1, the surface condition thereof, the energy delivered by the pulses at each laser pass on a given zone . . . . Routine experimentation will enable those skilled in the art to define these limits as a function of available equipment and the material to be treated.

Although this first approach allows a substantial reduction in the visibility of the overlap of two successive fields, as a function of the material used and/or the targeted effect, since the overlaps between fields (junctions 2) are not arranged in a straight line corresponding to the slow axis 7 but in a randomly broken line of which solely the general orientation substantially corresponds to the slow axis 7 and which follows the offsets between overlaps, it can however prove to be insufficient to obtain a sufficiently homogeneous surface. In this case, it is possible to use the same approach but by changing the offset between the different laser passes. This makes it possible to further increase the random nature of the positioning pattern of overlaps compared with the preceding case. In other words, the broken line joining the successive overlaps and forming said pattern is of nonperiodic or random type that is even less obvious. However, care must be taken to ensure that the juxtaposed treatment fields have the same offsets as the first for each pass, since local accumulation of laser passes must be avoided to obtain treatment of homogeneous appearance, in the same manner as ideally every point of the surface should receive the same amount of energy according to the same distribution, the same number of pulses and passes.

The use of a random superimposition pattern for field edges therefore allows distribution of points of heterogeneity without the latter forming a straight line or a broken line of short period which would be too visible for the naked eye. When the pattern they create is identical for all laser passes along the fast axis forming a given line, these points of superimposition are local points having high heterogeneity since the discontinuity of the line is marked on each pass.

As indicated, a certain periodicity of the pattern of the field edge junctions 2 is acceptable if it is obtained over a sufficient length along the slow axis 7, namely at least equal to ten times the maximum value of the offset between the junctions 2 on two successive lines 5, 6 along the slow axis 7.

Performing the treatment in the form of lines oriented along the fast axis allows advantage to be taken of the high repetition frequency of lasers of ultrashort pulse duration, to increase the productivity of treatment. Therefore, in a single scan of the line by the scanner along the fast axis, the line is able to be irradiated N times if the distance between two pulses of two contiguous fields is equal to the diameter of the pulse divided by N. This therefore allows erasing of the effect that small fluctuations of power could cause on surface homogeneity. For example, to obtain N successive irradiations of one same point on the surface of the metal sheet 1, N passes of the laser beam 9 on said point are not necessarily required, a single pass of the laser beam 9 may suffice.

However, this mode of action has the disadvantage of forming zones of heterogeneity on line ends over distances equivalent to the diameter of a pulse (a few tens of micrometres).

As indicated, the iridescent effect obtained by treatment with a laser 8 of ultrashort pulses is related to the spontaneous formation on the surface of the metal sheet 1 of a periodic structure having behaviour similar to an optical network on surface-reflected light. As previously discussed, the formation mechanism of this structure of wavelets distributed periodically over the treated surface has not yet been determined by the scientific community.

However, it has been shown (see for example the document «Control Parameters In Pattern Formation Upon Femtosecond Laser Ablation», Olga Varlamova et al., Applied Surface Science 253 (2007) pp. 7932-7936), that the orientation of wavelets is chiefly related to the polarization of the laser beam irradiating the surface. For example, on stainless steel, the orientation of HSFLs is parallel to the polarization of the incident beam whereas LSFLs, which are subsequently formed when a greater amount of energy is delivered to the sheet surface, are oriented perpendicular to polarization of the incident beam. On other materials, a reverse effect is observed but this does not call into question the applicability of the invention to these materials.

For laser treatment in lines, a surface treated without modification of polarization of the laser beam 9 throughout the different passes thereof on a given line of said surface, would therefore result at the end of treatment in a structure composed of lines/wavelets all oriented in the same direction. This means that the "optical network" effect of the surface is also oriented.

The iridescent effect appears maximal if observation is made in transverse direction to the orientation of the wavelets and decreases as and when the orientation angle of observation aligns with the structure of the surface. Therefore, observation of the surface in the alignment of the wavelets does not cause the colour to appear. This can amount to a disadvantage for the end product since it requires proper choosing of the orientation of the wavelets at the start of treatment, to obtain a product having the iridescent effect under the desired viewing conditions. In addition, the end product only appears fully coloured along one main direction of viewing for a given light source.

Figure 2:
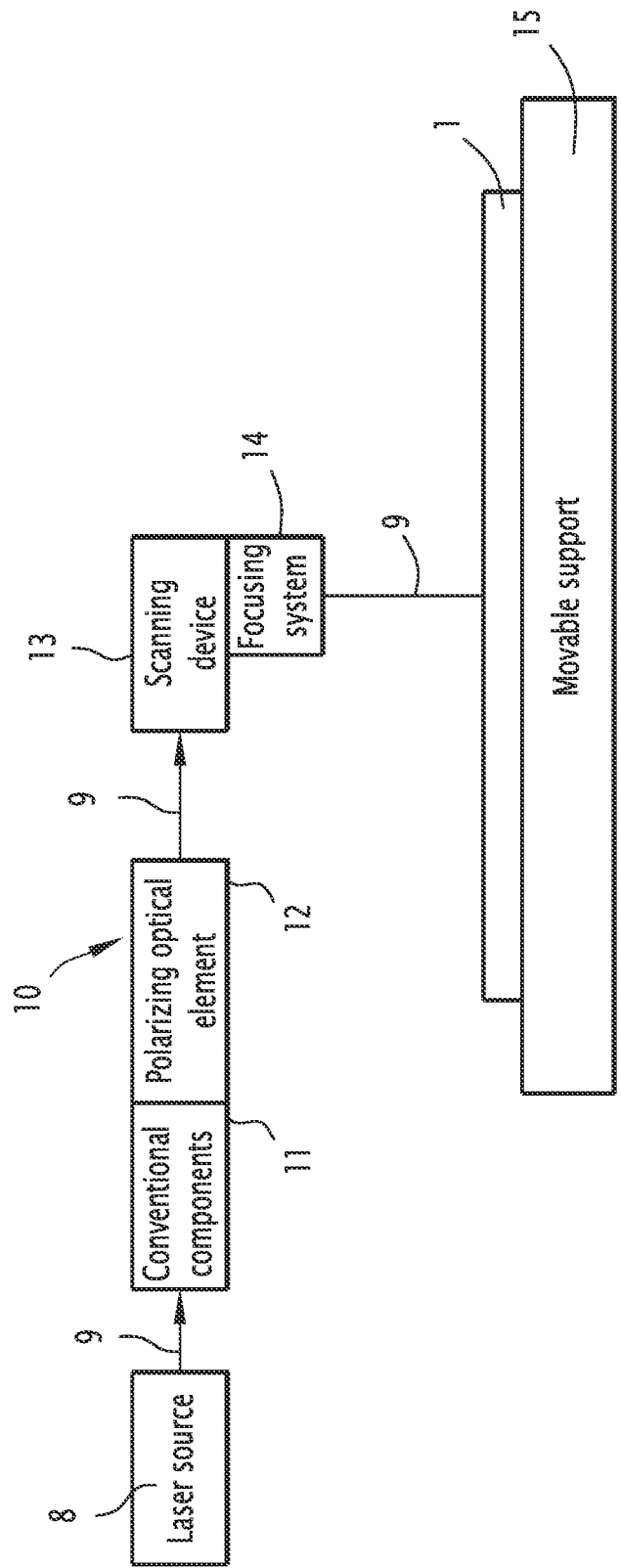
FIG. 2 gives the flow diagram of a device of the invention allowing implementation of the method of the invention in the optical field of a laser treatment device, and also allowing observation of surface iridization of the metal sheet independently of observation angle, according to one preferred variant of the invention.
Figure 3:
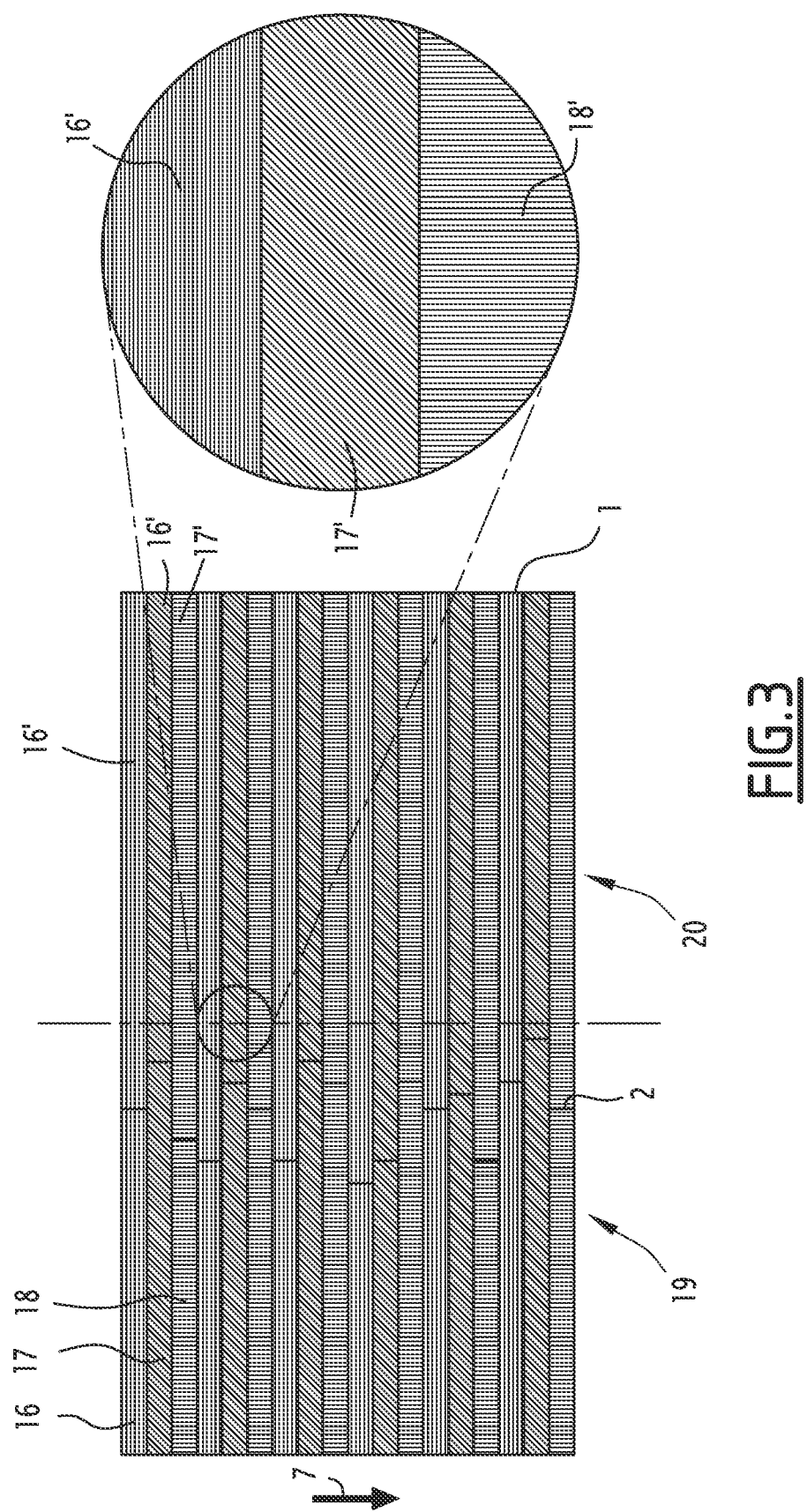
FIG. 3 shows the surface of a metal sheet resulting from implementation of the preferred variant of the method of the invention, improving the method used in the case in FIG. 1.

The optimal variant of the invention, subject of FIGS. 2 and 3, allows this disadvantage to be averted. If two successive fields together forming one same line over the entire width of the metal sheet 1 (the direction perpendicular to the slow axis 7) have the same polarization on this line, the visual effect of double treatment of the junction zone between these two fields tends to be much less marked than when the two fields have different polarizations with a difference in angle of polarization, a difference which is preferably between 20 and 90°.

Also, in the preferred variant of the invention, having polarizations that definitely differ sufficiently between two successive lines in the relative direction of travel 7 of the part and of the laser scanner devices, obviates the directionality of observation of the iridescent effect. The combining of the phenomena described means that the iridescent effect of the treated metal sheet 1 appears much more uniform in all viewing directions than in the case when there is not this alternation of polarization between contiguous lines.

Treatment is performed "in lines", with a distance separating the centres of the pulses that is slightly smaller than the diameter of the pulse in the direction of fast scanning, to ensure that there are no zones not treated by the pulse. The solution according to the preferred variant of the invention is to alternate lines for which wavelet orientation is modified from one line to another, via the action of a polarizer or any other type of polarizing optical device positioned on the optical pathway of the laser beam 9.

Therefore, either the treatment field is obtained with an automatic system allowing modification of the polarization of the incident beam between each line, or the treatment field is obtained in a number of times M equal to at least two and preferably to at least three, M therefore corresponding to the number of different orientations imparted to the wavelets by the periodically successive polarizations of the laser beam pulse forming these wavelets.

FIG. 2 schematizes a typical architecture of part of a unit device allowing implementation of the method of the invention, including in the preferred version just mentioned, to treat part of a stainless-steel metal sheet 1 on a given field. Evidently, this device is controlled by automated means allowing synchronization of the relative movements of the support 15 of the sheet 1 and of the laser beam 9, and adjustment of the laser beam parameters and focusing thereof as needed. The programming of these automated means is within the reach of persons skilled in the art.

The unit device in FIG. 2 first comprises a laser source 8 of a type conventionally known to obtain iridescent effects on metal surfaces, therefore typically a source 8 generating a pulsed laser beam 9 of short pulse duration (less than one nanosecond), the diameter of each pulse typically being of the order of 30 to 40 μm. The energy injected onto the surface of the stainless steel by the pulse is to be determined experimentally so as to generate LIPPS wavelets on the surface of the metal sheet 1, preferably of LSFL type and to prevent the formation of bumps and even more so of spikes, and the frequency and power of the laser beam 9 must be chosen accordingly following criteria known to skilled persons for this purpose and having regard to the precise characteristics of the other elements of the device and of the material to be treated. The laser beam 9 generated by the source 8 passes through an optical system 10 forming the beam 9 which, in addition to its conventional components 11 allowing adjustment of the shape and size of the beam 9, optionally comprises according to the preferred variant of the invention a polarizing optical element 12 allowing imparting to the beam 9 of a polarization chosen by the operator or the automatisms managing the device.

The laser beam 9 next passes through a scanning device (e.g. a scanner) 13 which, as is known, enables the beam 9 to scan the surface of the metal sheet 1 along a rectilinear pathway (fast axis) in a treatment field. At the outlet of the scanner 13, again as is conventional, there is a focusing system 14 such as a focusing lens by means of which the laser beam 9 is focused in the direction of the metal sheet 1.

In the illustrated example, the metal sheet 1 is carried by a mobile support 15 allowing movement of the metal sheet 1 along a plane in direction 7 (slow axis) or optionally in the three dimensions of space relative to the device generating, polarizing and scanning the laser beam 9, so that the latter is able to treat the surface of the metal sheet 1 along a new line of the treatment field of the illustrated device.

Preferably, before this treatment of said new line, according to one variant of the invention the result of which is illustrated in FIG. 3, the adjustment of the optical polarizing device 12 of the laser beam 9 has been modified so as to impart polarization to the laser beam 9 that differs from its previous polarization when treating the preceding line. At least two different angles of polarization and preferably at least three are able to be obtained with the optical polarizing device 10 and are alternated preferably but not necessarily in periodic fashion at each line change. Periodicity of the polarization pattern is not essential, as mentioned it is sufficient that the polarization angles of two contiguous lines 16, 17, 18, 16', 17', 18' along the slow axis 7 are different, preferably differing by at least 20° and no more than 90°. However, periodicity of the pattern, for example as illustrated with polarization angles that are repeated every three lines 16, 17, 18, 16', 17', 18', is preferred insofar as periodic programming of polarization change is simpler than random programming, in particular since two lines 16, 16' or 17, 17' or 18, 18' belonging to two different fields and lying in the continuation of each other along the fast axis and meeting at a junction 2 must have the same wavelet orientation.

A succession of random polarizations within a given optical field, nevertheless preferably heeding the aforementioned minimum angle difference of 20° to 90°, would be acceptable.

In the invention, the assembly of the treatment device of the metal sheet 1 comprises a plurality of unit devices such as just described, positioned facing the metal sheet 1, and which are juxtaposed so that the respective treatment fields of two juxtaposed unit devices i.e. the optical fields of the focusing systems 14 of their respective scanners 13, slightly overlap. This overlapping is typically about twice the size of the pulse, plus positional uncertainty related to the pulse feed period of the laser 8 and the scanning rate of the laser beam 9 along the fast axis. It must be experimentally verified that this overlap is sufficient to ensure that there does not subsist any non-treated zone on the metal sheet 1 at the end of the operation. Additionally, the lines 16, 16' or 17, 17' or 18, 18' generated by each of these fields must lie in the continuation of each other on two contiguous fields, and the adjusting of the unit devices must be identical for two contiguous fields, particularly in terms of shape, size, power and polarization angle at a time t of their respective laser beams 9, so that treatment is homogeneous over an entire line having the width of the metal sheet 1, and so that the alternation of the polarization angles of the laser beam 9 between two consecutive lines 16, 17, 18, 16', 17', 18' along the slow axis 7 is the same over the whole width of the metal sheet 1.

The means controlling these unit devices are most typically means common to all the unit devices so that they operate in perfect synchronization with each other. Preferably they also control movements of the support 15 of the metal sheet 1, here again for best synchronization of the relative movements of the metal sheet 1 and of the laser beams 9 of the unit devices.

Evidently, the mobile support 15 could be replaced by a fixed support, and the relative movement of the metal sheet 1 and of the laser beams 9 of the unit treatment devices could be ensured by placing these on a mobile support. Also, both variants could be combined in that the device of the invention would comprise both a mobile support 15 for the metal sheet 1 and another mobile support for the unit treatment devices, either one of the two possibly being actuated or both simultaneously by the control device as desired by the user. If there is only one treatment device, it is moved along the fast axis once it has treated part of the metal sheet 1. In this case, the pattern of the junctions 2 made when the device treated part of the metal sheet 1 is kept in memory and this same pattern is produced on the field(s) treated after movement(s) of the device along the fast axis.

Also, the relative movement of the metal sheet 1 and of the laser beams 9 of the unit devices along the slow axis 7 can be obtained with optical means integrated in the unit treatment devices and acting on the points of the fast axis for movements of the laser beams 9 of these unit devices. These optical means substitute for, or are added to, the mechanical means for moving the mobile support 15 of the metal sheet 1 and/or the mobile support of the lasers 8 of the unit treatment devices.

Purely optical means could suffice to treat parts of small size, but strongly risk being insufficient to treat parts of relatively large size with sufficient accuracy. However it is possible to combine optical means and mechanical means by placing the mechanical means at a given position and obtaining relative movement of the laser beam 9 along the slow axis 7 with the optical means over a sufficiently short distance «d» so that the precision of relative movement is sufficient, then moving the mechanical means over a distance equal to «d» to continue treatment of the metal sheet 1 using the optical means to obtain further relative movement of the laser beams 9 and of the metal sheet 1 along the slow axis.

In the preferred variant of the invention, the number M therefore corresponds to the number of different orientations it is desired to give to the wavelets, ensuring spacing M times larger than conventional treatment, and by offsetting the lines by conventional spacing between each field implementation. FIG. 3 shows an example of the appearance of said creation with M=3.

The metal sheet 1 on its surface exhibits a periodic succession of lines 16, 17, 18, 16', 17', 18' formed by two devices of the invention which allowed the creation of this periodic pattern of three kinds of said lines on two contiguous optical fields 19, 20, the lines 16, 17, 18 of a given field lying in the continuation of similar lines 16', 17', 18' made in the contiguous optical field.

The lines 16, 17, 18, 16', 17', 18' of the pattern differ from each other via the effects of different polarizations that the polarizing device 12 at the time of their formation applied to the laser beam 9.

As can be seen in the portion of FIG. 3 illustrating a magnified fraction of the surface of the metal sheet 1, in the illustrated nonlimiting example, the polarization imparted to the laser beam 9 on generation of the first line 16, 16' of the pattern leads to orientation of the wavelets in the direction perpendicular to the relative direction of travel 7 (slow axis) of the metal sheet 1 in relation to the laser treatment device. Then, to generate the second line 17, 17' of the pattern, the polarization of the laser beam 9 has been modified to obtain orientation of the wavelets at 45° from the orientation of the wavelets of the first line 16, 16'. Finally, to generate the third line 18, 18' of the pattern, the polarization of the laser beam 9 has been modified to obtain orientation of the wavelets at 45° from the orientation of the wavelets of the second line 17, 17', hence at 90° from the orientation of the wavelets of the first line 16, 16': the wavelets of the third line 18, 18' are therefore oriented parallel to the relative direction of travel 7 of the metal sheet 1 in relation to the laser treatment device.

In the junction zone of two lines 16, 16', 17, 17', 18, 18' lying in the continuation of each other, energy is therefore injected onto the surface of the metal sheet 1 that is greater than the energy injected onto the remainder of the surface, as in the basic variant of the invention previously described. This fact is marked by the existence of zones 2 which have been over-treated and located at the junction of contiguous fields, the precise position of which within the overlapping area of the fields is random conforming to the invention. However, in these junction zones 2, since the lines 16, 17, 18, 16', 17', 18' of each optical field which join up were produced with the same polarization of the laser beam 9, this further and more largely attenuates deterioration of the visual iridescent effect of the surface of the metal sheet, which would be encountered if there were no controlled polarization of the laser beam 9. Lack of continuity of the orientation of the wavelets from one optical field to another would tend to increase the visibility of the junction zone of the fields on a given line, creating an area of heterogeneity on the surface. Care must simply be taken to ensure that the lines 16, 17, 18, 16', 17', 18' of the two contiguous fields made with same polarizations lie in proper continuation of each other, but this precaution for co-linearity of lines 16, 16', 17, 17', 18, 18' of contiguous fields also needed to be taken for implementing the basic version of the method of the invention, see FIG. 1, and the equipment used for this purpose can also be used for this variant of the invention. It only needs be ensured that the polarization changes of the laser beams 9 of the devices for each field are carried out with the same values for the joining lines 16, 17, 18, 16', 17', 18' of the fields.

The use of M=2 orientations of different polarizations offset for example by 90°, is already sufficient to obtain a visible iridescent effect along most viewing directions. However, the intensity of the iridescent effect still varies fairly substantially when viewing at an angle of 45°, and it can be considered that the problem of lack of directionality of the iridescent effect is still not solved in fully satisfactory manner. This is no longer visible as soon as M is higher than 2, preferably if the angles differ by more than 20° between two successive lines 16, 17, 18, 16', 17', 18'.

Therefore, by performing treatment with at least three different angles of polarization distributed between 0 and 90° and preferably having polarization differences of at least 20° between two successive lines 16, 17, 18, 16', 17', 18' along the slow axis 7, experience has shown that the iridescent effect of the surface is visible in all directions with similar intensity. It is possible to use a number of orientations M higher than 3, but care must then be taken to ensure that the polarization angles of two contiguous lines differ sufficiently from each other to avoid directionality of the desired iridescent effect.

It is evident however that the distribution of surface structure in different orientations induces a decrease in the total intensity of the iridescent effect when compared with a surface treated in a single direction of polarization and viewed at an optimal angle (transverse angle to the structure). A trade-off must therefore be found between the intensity of the visual iridescent effect perceived by an observer and the omnidirectional nature of this iridescent effect. However, three directions of polarization (hence a periodicity of three lines of these directions, as illustrated in FIG. 3) already represent said good trade-off at least in the most frequent cases.

Finally, to obtain an effect that is the most homogeneous possible, it is recommended to alternate the orientations, preferable in periodic fashion, over the shortest distances possible. For M different orientations, it will be preferred periodically to alternate only one line of each orientation, having a width equal to, or preferably (to ensure treatment of the entire surface of the metal sheet) slightly smaller than the diameter of the pulse.

It is possible to treat metal sheets 1 not having perfect planarity by including means in the treatment device to measure the distance between the focusing system 14 and the metal sheet 1, and by coupling these with the control means of the focusing system 14, so that the latter can guarantee that the diameter of the pulse and the fluence of the laser beam 9 are substantially the same irrespective of the effective distance between the focusing system 14 and the metal sheet 1. As a variant, said means for measuring the distance between the focusing system 14 and the metal sheet 2 can be servo controlled by means ensuring the relative movement of the device of the invention and the metal sheet 1, allowing the distance between the focusing system 14 and the surface of the metal sheet 1 to be maintained constant throughout treatment of the metal sheet 1.

The application of the method can also be envisaged to materials other than planar metal sheets (for example to formed sheet, bars, tubes, parts generally comprising three-dimensional surfaces), by accordingly adapting the means for relative movement of the lasers and part to be treated, and/or the controls of the focusing means if differences in distance between the laser emitter and the surface are to be managed. For parts having substantially cylindrical surfaces (bars, tubes of circular section for example), one manner of proceeding would be to place the laser devices on a fixed support and to provide a support for the part allowing the part to be placed in rotation so that the surface of the part travels in the optical fields of the lasers.

Finally, it is recalled that while stainless steels are materials to which the invention can be applied in priority, other metal and nonmetal materials on which an iridescent effect can be obtained on the surface thereof by laser treatment are also concerned by the invention.

The invention claimed is:

1. A method for the creation of a visual iridescent effect on the surface of a part, whereby laser beams having a pulse duration of less than one nanosecond are sent onto said surface, in the juxtaposed optical fields of the focusing systems of at least two fixed devices, or in the field of at least one mobile device, said device(s) each comprising a laser source, a scanner and said focusing system for applying a structure in the form of wavelets to said surface over the width of said pulse, and scanning of said surface is performed by said scanner(s) by said laser beams along a series of successive lines in a relative direction of travel of the part and of the scanner(s)) and a series of lines lying in the continuation of each other in a direction perpendicular to said relative direction of travel, and each belonging to the optical field of the device(s), each line having a width equal to the diameter of said pulse, wherein said optical fields of two fixed juxtaposed devices or the optical fields corresponding to two successive positions of said mobile device overlap in an overlapping area of width between twice the diameter of the pulse of the laser beam and 2 cm, so that two lines lying in the continuation of each other overlap at a junction, and in that between two series of successive lines in a relative direction of travel of the part and of the scanner(s), said junction zones are arranged randomly or periodically organized in a random pattern with periodicity equal to at least ten times the maximum value of the offset between the junctions on two successive lines in said relative direction of travel inside said overlapping area of the optical fields.

2. The method according to claim 1, wherein between the performing of scanning along two successive lines in said relative direction of travel of the part and of the scanner(s), a polarization of the laser beam is modified to create wavelets of different orientations on said two successive lines and of common two-by-two orientation in the direction perpendicular to the relative direction of travel.

3. The method according to claim 2, wherein the polarization of the laser beam is modified in a periodic pattern, said periodic pattern extending over M consecutive lines in the relative direction of travel of the part and of the scanners, M being equal to at least 2.

4. The method according to claim 2, wherein two successive lines in the relative direction of travel of the part and of the scanners have angles of polarization differing by at least 20°.

5. The method according to claim 2, wherein the polarizations of two lines of two contiguous fields lying in the continuation of each other are the same.

6. The method according to claim 1, wherein said relative movement of said surface of said part and of the devices emitting said laser beams is obtained by placing said part on a mobile support.

7. The method according to claim 1, wherein said relative movement of said surface of said part and of the devices emitting said laser beam(s) is obtained by placing the device(s) emitting said laser beams on a mobile support.

8. The method according to claim 1, wherein said part is a metal sheet.

9. The method according to claim 1, wherein said surface of said part is three-dimensional, and in that the distance is measured between the focusing system and the surface of the part, and in that the focusing system is controlled so that it guarantees that the diameter of the pulse and the fluence of the laser beam are substantially the same irrespective of the effective distance between the focusing system and the part.

10. The method according to claim 1, wherein said surface of said part is three-dimensional, and in that the distance is measured between the focusing system and the surface of the part, and in that the relative position of said device and of said surface is controlled so that the distance between said focusing system and said surface remains the same when implementing the method.

11. The method according to claim 1, wherein said part is in stainless steel.

12. A device for imparting an iridescent effect to the surface of a part through the formation of wavelets on said surface by the pulse of a laser beam, said device being formed of at least two fixed juxtaposed unit devices or of at least one mobile unit device, each comprising a laser source generating a laser beam of pulse duration less than 1 ns, an optical system shaping the beam, a scanner enabling the pulse of the beam, after it has passed through a focusing system, to scan in the form of lines an optical field on the surface of the part, said optical fields of two juxtaposed unit devices overlapping over a width of between twice the diameter of the pulse of the laser beam and 2 cm containing the junctions of two lines each produced by a unit device, and means for creating relative movement in a given direction between said device and said part (1) to perform treatment on at least one portion of the surface of said part, wherein the device is controlled by automated means for synchronizing the relative movement between said device and said part and for adjusting parameters of the laser beam and focusing of the laser beam, so that said scanners of said unit devices allow said junctions to be arranged so that together they form a random pattern, or are periodically organized in a random pattern with periodicity equal to at least ten times the maximum value of the offset between the junctions on two successive lines in said relative direction of travel inside said overlapping area of the optical fields.

13. The device according to claim 12, wherein the optical systems of said unit devices comprise an optical polarizing system imparting determined polarization to said beam, and means to cause this polarization to vary so that, on said surface, two contiguous lines in direction are produced with pulses of different polarizations.

14. The device according to claim 13, wherein said unit devices allow the forming of two contiguous lines with pulses of which the polarizations differ by at least 20°.

15. The device according to claim 12, wherein said means for creating relative movement in a given direction between said device and said part comprise a mobile support for the parts.

16. The device according to claim 12, wherein said means for creating relative movement between said device and said part comprise a mobile support for said unit devices.

* * * * *